May 16, 1950  J. A. BALL  2,507,494
PROCESS OF MULTICOLOR REPRODUCTION
Filed Sept. 2, 1947  4 Sheets-Sheet 1

INVENTOR.
Joseph Arthur Ball
BY
Lynn Barratt Morris
ATTORNEY

May 16, 1950  J. A. BALL  2,507,494
PROCESS OF MULTICOLOR REPRODUCTION
Filed Sept. 2, 1947  4 Sheets-Sheet 3

FIG. 5.

INVENTOR.
Joseph Arthur Ball
BY
*Lynn Barratt Morris*
ATTORNEY

May 16, 1950  J. A. BALL  2,507,494
PROCESS OF MULTICOLOR REPRODUCTION
Filed Sept. 2, 1947  4 Sheets-Sheet 4

FIG. 6.

INVENTOR.
Joseph Arthur Ball
BY
Lynn Barrett Morris
ATTORNEY

Patented May 16, 1950

2,507,494

UNITED STATES PATENT OFFICE 2,507,494

PROCESS OF MULTICOLOR REPRODUCTION

Joseph A. Ball, Los Angeles, Calif.

Application September 2, 1947, Serial No. 771,790

7 Claims. (Cl. 95—2)

This invention relates to processes for reproducing multicolor images utilizing four subtractive color components. In one of its useful aspects the invention relates to photographic processes for reproducing multicolor images which utilize four subtractive color components. Another useful aspect is concerned with processes for reproducing multicolor images utilizing four different colored substances.

All methods of color reproduction can be most clearly comprehended if they are considered as means for controlling spectral bands. If the bands are sufficiently narrow and sufficiently great in number, then the reproduction process can be purely objective in nature; that is to say, it need only record and reproduce the physical stimulus band by band. A color reproduction process of this description also should obviously be able, in principle at least, to record and reproduce electromagnetic frequencies above and below those to which the eye is sensitive.

The practical processes of color photography all work on quite a different principle, in that they aim to imitate the action of the eye. They are, therefore, quasi-subjective in nature. They aim to evaluate the component parts of a scene just as the eye does and to relay this information from the camera, which stands in lieu of the observer's eye, through the reproduction process to the eye of the final observer. In this procedure the camera and the process generally must respect the laws of exchange in the color domain which are determined by the eye and its attendant nervous apparatus. It is especially important that the luminosity evaluation by the color process be similar to that made by the eye. This imitation of the eye is the essence of Maxwell's method of color photography, first proposed in 1861.

It has long been recognized that the color domain of the normal eye has three dimensions. This led to the well-known Young-Helmholtz three-component theory which postulates three independent primary color response processes somewhere in the eye and its attendant nervous apparatus. Maxwell's three-color method of photography correspondingly endeavors to imitate these three primary color response functions. For additive methods of reproduction, the theoretical requirements are very simply formulated. It is not necessary to know the exact nature of the three primary visual response functions. Whatever they are, they must collectively correspond to one set in a group of spectral distribution curves obtained by linear projective transformations of the fundamental color-mixture data. This data is obtained by the use of three essentially arbitrary spectral bands, i. e., colored lights, in a physical instrument known as a colorimeter, with a human eye observing.

If then, in the colorimeter, one used as reference primaries the light transmitted by three filters identical with those to be used in the additive projection process (and, of course, used the projection light source or its equivalent), one obtains color-mixture data which is precisely that which must be respected by the camera in the analysis process. In fact, the combination of flux intensity, film sensitivity, and transmission of the three camera filters, or their equivalents, should ideally produce these response functions.

When these response functions are displayed on an equal area basis, they define the way in which increments of exposure for the separation images must be picked up throughout the spectrum. When weighted according to the luminosities of the primaries they are to control, these response functions add up to yield the luminosity function.

As is well known, the response functions for any three real primaries always contain one or more negative bulges. Such negative bulges imply that, for the response and the spectral range pertinent to them, negative increments of exposure should be given in the camera. In the case of subtractive processes, there is the added requirement that the primary bands be broad enough to collectively compass the entire spectrum. In that case, as will be explained in more detail later, the negative components in the response functions become very pronounced. The question as to how to deal with these negative components is one of the fundamental problems of color reproduction processes. Not only is it difficult to realize negative increments of exposure, but even if realized, negative components of exposure would induce an undesirable quality in any subtractive print. This invention overcomes this undesirable action by reducing the negative components of the response functions to such low values that they can safely be ignored.

An object of this invention is to provide new and improved methods of multicolor reproductition. Another object is to provide such processes which are superior to the prior art processes. Still further objects are to provide such processes wherein negative components are rendered ineffective to disturb the final subtractive picture. Still further objects are to provide such processes wherein four color components are used. Yet another object is to provide color reproduction processes whose color gamuts will fill the spectrum locus on a uniform chromaticity diagram in such fashion as to enable the process to reproduce all colors with fidelity. Still other objects will be apparent from the following more detailed description of the invention and the accompanying drawings which constitute a part of the present specification.

I have discovered that there are as many as five unique zones in the visible spectrum that must be considered in processes of multicolor reproduction. These zones will be described with reference to Figure 1 of the drawings. This figure displays the spectrum locus on the Rectangular Uniform Chromaticity Scale of Breckenridge and Schaub (ref. J. O. S. A. 29, 1939, p. 370). This scale has the advantage over the usual I. C. I. chromaticity diagram that visually equal color steps appear as approximately equal geometrical steps on the diagram. The relationship of the two diagrams is discussed at length on pages 182-188 inclusive of the book entitled "The Measurement of Colour" by W. D. Wright (Hilger, London, 1944).

Figure 1:
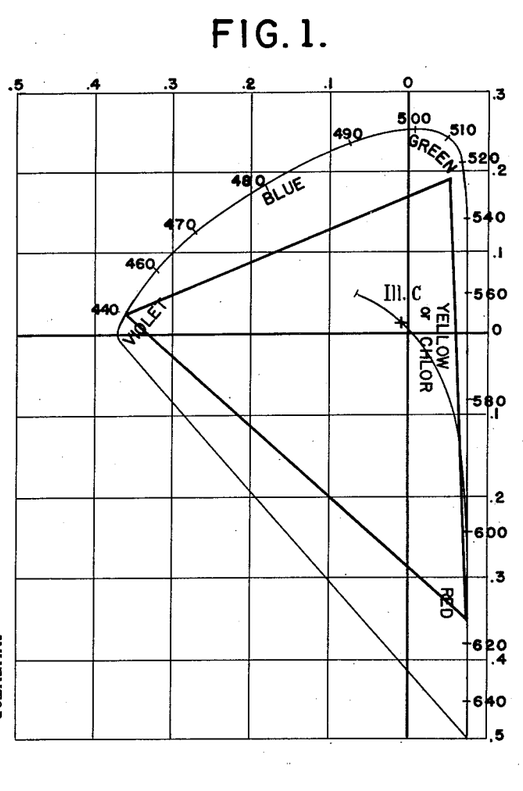

The approximate locations of the five unique bands are indicated in Fig. 1. These five bands appear violet, blue, green, yellow, and red. It should be understood immediately that the spectral yellow band will not appear truly yellow when viewed in comparison with the other bands. When so viewed, it is a sort of olive color, dingy and greenish-yellow in hue. It will be referred to as the chlor band or component.

It will be noted that these five bands are located rather uniquely with respect to the spectrum locus on the Rectangular Uniform Chromaticity Scale. The violet, green, and red bands are located well into the corners of the spectrum locus, and this triad necessarily contains no complementary pair. The blue and chlor bands are located at approximately the mid points of the two legs of the spectrum locus and are approximately complementary.

The best that can be done in three-color additive reproduction is to use the triad of the abovementioned violet, green, and red bands as the primaries. The triangle shown in Fig. 1 joining the zones which represent these bands is then the gamut attainable by such a process. It will be noticed that because of the curved nature of the spectrum locus, this triangle lies well inside the spectrum locus. The areas which lie outside the triangle but within the spectrum locus correspond in location, magnitude, and general significance with the above-mentioned negative bulges in the response curves pertinent to such a process. Practically, the performance of such a three-color additive process as is here described is rated as satisfactory though it is still recognized as being somewhat short of perfect.

A three-color additive process of this description further makes no provision for the use or control of the blue and chlor bands. These two bands are quite important and in ordinary white light they are approximately complementary and comprise 50% of the total luminosity. A subtractive process, wherein the prints must be viewed in full white light, must make provision for the use and control of these bands. To accomplish this, very radical compromises are required.

The customary solution by way of such compromise in present day three-color subtractive reproduction methods (which has been found by purely empirical methods) is based upon cutting the spectrum arbitrarily into three bands, making the cuts at 490 and 580 millimicrons. The location of the "centers of gravity" of these compromise bands in Illuminant C and the corresponding triangular gamut are shown in Figure 2 of the diagrams attached hereto.

Figure 2:
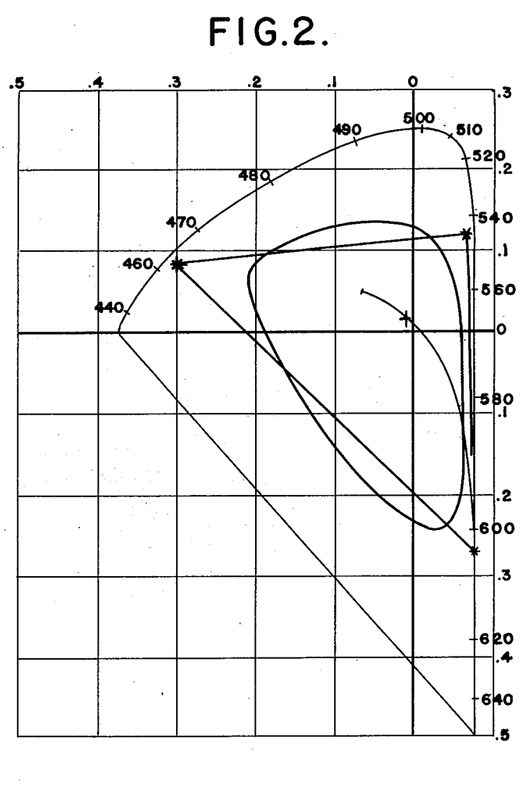

In Figure 2 is also shown the envelope of maximum chromas encountered in the Munsell system. (Data taken from Table III, page 384, J. O. S. A., July 1943.) These Munsell colors all have matte surfaces. Show-card colors and some of the pigments found in nature may somewhat exceed the confines of this envelope but such extension will be approximately equal in all directions on the diagram.

It will be noted that the triangle of Figure 2 fails to include approximately equal areas from this envelope in upper and lower halves of the diagram. That is another way of saying that the compromise favors no particular region. That is undoubtedly the reason for its selection. When the response functions for these idealized primary bands are computed, they naturally show large negative components in all three responses corresponding to the areas between the spectrum locus and the triangular gamut.

When these response functions are weighted for the relative luminosities of the corresponding primary bands, they add up to produce the standard luminosity function. They can then individually be considered as the distributed contributions to the total luminosity to be obtained from each primary. A negative bulge, therefore, represents negative luminosity—an unreal concept which is quite unrealizable by any of the usual procedures.

The practical compromise involves balancing the negative areas of response against the nearest related equal positive areas. The sharp cuts which effect these compromises occur precisely where the primary bands adjoin, namely 490 and 580. Simultaneously the summated luminosity curve is made rather wavy though the correct general contour is, of course, approximated. Simultaneously also, the ability of the process to distinguish properly between red and orange rays and between blue and violet rays and between various hues of green rays is seriously compromised.

This compromise explains the otherwise puzzling fact that sharp-cutting mutually exclusive analysis filters yield best results in three-color subtractive processes.

The specification of these abutting primary bands likewise determines the properties of satisfactory practical dyes or pigments for a three-color subtractive process even though such dyes or pigments always possess sloping cuts. To describe this, however, we have to introduce the concept of absorption band-width and absorption center, particularly for the absorber of the green band, i. e., the usual magenta colorant. The effective absorption band-width of a practical colorant can be defined as the separation between wave lengths for which absorption, measured as density, is half the maximum. The mid-point between the two half-maximum densities can then be defined as the effective absorption center.

Since reds and yellows are sensitive to degradation, whereas greens and blues are not, it is important to choose absorbers which have negligible absorption in bands of wave lengths longer than those they are designed to control. A moderate amount of absorption in bands of shorter wave lengths can then be ignored.

Residual short-wave absorption must, however, be allowed for in estimating the band-width and the absorption center; that is to say, the point from which measurement is made should be halfway from the maximum density to the residual density. (In the normal or average absorption curve, these half-maximum density points would be located close to the inflection points, i. e., points of maximum rate of change of absorption with wave length.)

Residual short-wave absorption will, however, affect the appearance of a colorant very considerably. This establishes that appearance alone is not an adequate basis for judging the suitability of a colorant for a subtractive reproduction process. The real primary pertaining to a subtractive color component appears when that component is omitted, while the other components are superimposed at full intensity. The dominant hue of that true primary will be closely related to the absorption center of the omitted colorant. That is the reason for the importance of the specification of absorption center.

Only in the case of sharp-cutting yellow colorants (violet absorbers) will the dominant hue of the colorant be complementary to the dominant hue of the corresponding true primary. However, there are characteristic departures from complementariness and various suitable absorbers for a given band will usually be much alike in appearance and will differ in appearance from suitable absorbers for other bands. Specifically most colorants (other than yellow) show a location on the Breckenridge and Schaub R. U. C. S. diagram which is shifted counter-clockwise from the position which is truly complementary to their respective absorption centers.

Now the center of the rectangular-shaped absorption band for the ideal magenta colorant is halfway between 490 and 580, i. e., at 535. Practical magenta colorants for use in three-color photography are found upon measurement to have absorption centers clustering closely around 535 millimicrons. Because compromises are involved, there is naturally some spread in that location but the range for desirable colorants is not great.

Once a magenta colorant has been selected, the specifications for the accompanying red absorber (cyan colorant) and blue-violet absorber (yellow colorant) are plain. Their absorptions must combine with the absorption of the magenta colorant to produce a satisfactory objective neutral density (i. e., one in which absorption is essentially uniform throughout the spectrum). The concept of absorption center cannot be applied precisely to the cyan and yellow colorants because their absorptions may extend outside the range of the visible spectrum.

There are no three practical colorants which will yield a satisfactory gamut in a three-color subtractive process. With practical absorbers which are overlapping and not sharp-cutting, it is possible to improve the gamut somewhat by increasing the contrast of the reproduction as compared with the original scene. In that case the dominant hue of the green primary moves closer to the absorption center of the magenta colorant and all colors in the reproduction move towards greater saturation. However, such an improvement in gamut is accompanied by lowered luminosity of shadows. Having in mind the ability to reproduce automatically both chroma and value, it is a well-known fact that three-color subtractive processes of the present day are inferior to three-color additive processes. In analyzing the reasons for this inferiority, I have discovered a way in which the performance of a subtractive process can be increased so as to equal or even exceed that of a three-color additive process.

Figure 3:
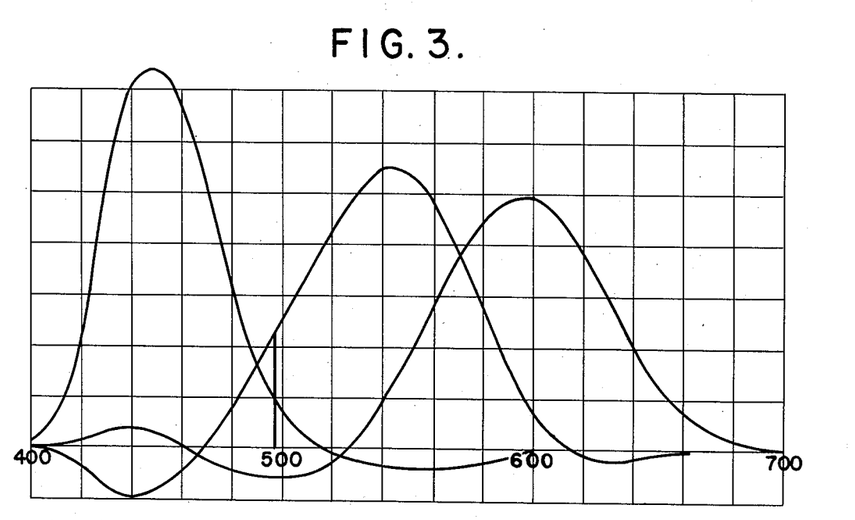
Figure 4:
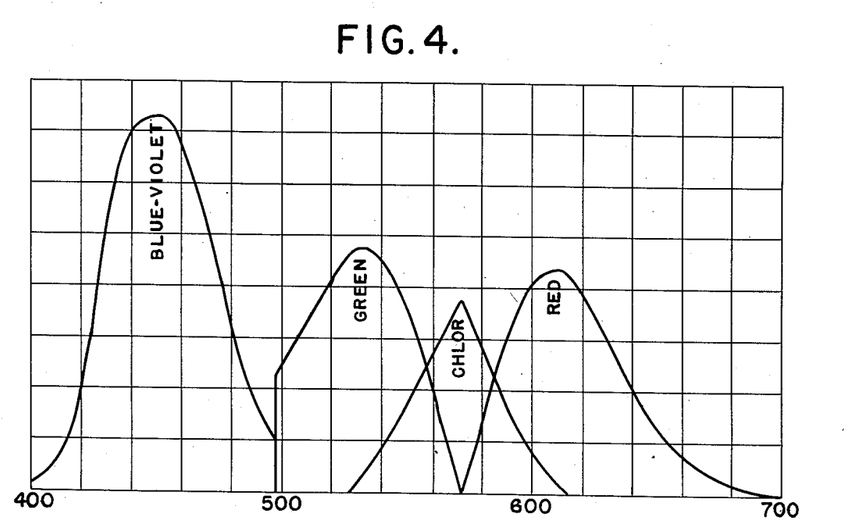

To show the essential nature of the present invention, consider first a three-color process based on the bands 400–500 (blue plus violet); 500–545 (green); and 600–700 (red) (all from Illuminant C). Notice that the chlor band has not been included. Consequently, such a process will not be suitable for the production of subtractive prints to be viewed in full white light. However, the response functions for a process of this description (which may be either additive or a specialized subtractive process viewable only in light from which the chlor band has been excluded) will have the response functions shown in Figure 3. Note that the red and green response functions have a very considerable overlap area. It is important to appreciate that the chlor band (545–600) is quite closely identical in its visual effect with the sum of the red (600–700) and green (500–545) primary bands. The overlapping area of the red and green response curves of Figure 3 is set up as a new response function in control of the chlor band which, consequently, need no longer be excluded. Simultaneously these overlapping areas are subtracted from the fundamental red and green response curves, thus setting up new restricted distribution curves for the control of the red and green bands. The resultant four response functions are shown in Figure 4. Because the overlap area is only about 37½% of the total area, this procedure is only effective for the control of about 60% of the chlor band but this is practically a very substantial and satisfactory step of improvement.

Referring back to Figure 3, it should be noted that the most troublesome negative component, whether displayed on an equal area basis as in Figure 3 or on a luminosity basis, is the negative bulge of the green response curve in the violet range peaking at about 440. The only practical procedure for dealing with this situation is as previously discussed, to consider this negative area as offset by the nearest related equal positive area. The cut which will accomplish this is indicated by the vertical line in Figure 3. This sharp cut has been carried over into Figure 4.

Figure 5:
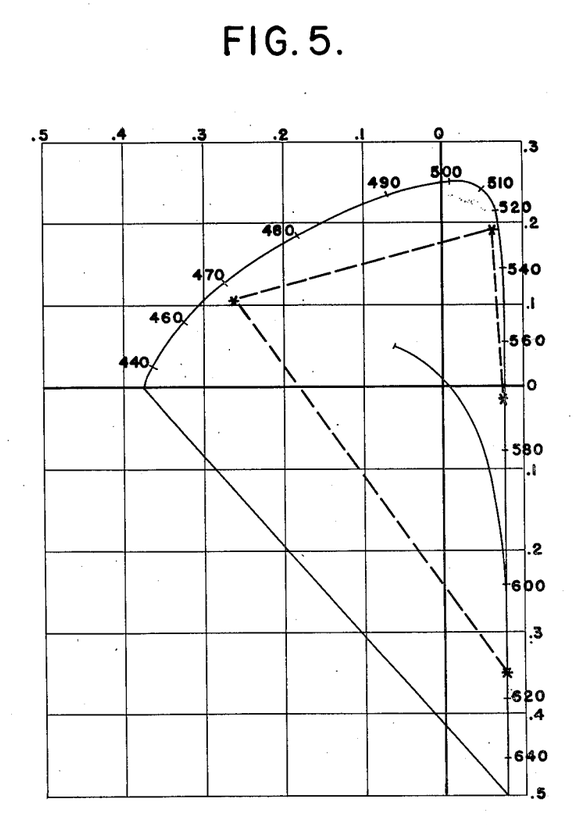

A four-color process of this description will possess the quadrilateral gamut of Figure 5, which obviously is larger than the triangular gamut of Figure 2. Correspondingly, the excluded areas are reduced and with them the troublesome negative components. The accomplishment up to this point has been to show how to control the major part of this fourth component in harmony with the fundamental color mixture rules.

It is sometimes argued that because of the three dimensional nature of color space, no more than three chromatic components can be used in any kind of a reproduction process. But two conditions over and above the three conditions imposed by the fundamental trichromatism have been accepted, namely that the primaries must embrace the entire spectrum and that negative components must be minimized. So there is adequate basis for the specification and control of four or even five components.

It should be appreciated that there exists some latitude in the precise location of the primary bands when selecting quadrilateral gamuts which substantially fill the spectrum focus on a uniform chromaticity scale.

A four-color process of a sort could be devised by retaining the specification for the red and green bands for a three-color process and dividing the usual three-color blue-violet band (380-490) into its component parts or alternatively by dividing the usual three-color green band (490-580) into two components. The first mentioned process would, in its subtractive version, incorporate the usual magenta (green-absorbing) and cyan (red-absorbing) colorants of a normal three-color process; whereas the second would incorporate the usual yellow (blue-absorbing) and cyan (red-absorbing) colorants. It should be noted that it is not possible to devise a four-color process using both the yellow and magenta colorants of a three-color process.

A greater improvement in gamut can be effected by employing as primaries the violet band, the red band, and two other bands which together cover the fundamental blue, green, and chlor bands. In order that such a solution may provide an adequate range of greens, it has been found to be desirable to shift the bands somewhat so that a more orange-red and a truly yellow-green primary are employed. Specifically, if the spectral cuts are made at 450, 520, and 580, the centers of gravity of the four bands will be located as in Figure 6, the gamut joining them being indicated by the solid line. Another four-color process can be devised by making cuts at 485, 545, and 600. The quadrilateral gamut for these primary bands is shown as a dashed line in Figure 6. The latter solution will reproduce a larger range of reds and greens but a more restricted range of blues and violets. It also seems most favorably located with respect to the oval envelope of bright surface colors shown in Figure 2. Other possibilities exist intermediate to these two but they are all characterized by the fact that the two intermediate bands have centers which straddle that of a three-color green band suitable for a subtractive process. Specifically the spectral ranges for these centers are 485 to 525 and 545 to 575 millimicrons. Suitable colorants with absorption centers in these ranges appear pink and purple, respectively. Neither one by itself would be satisfactory as a substitute for a magenta colorant of a three-color process.

Which of these four-color compromises is best for a particular multicolor reproduction process depends in part upon the colors which it is desired to favor and also upon the available absorbers. Any of the four-color methods indicated herein will yield results superior to the three-color method of Figure 2.

Three representative four-color processes of the invention are provided by using as primaries the bands:

| A | B | C |
|---|---|---|
| 400-500 | 400-450 | 400-485 |
| 500-545 (522.5) | 450-520 (485) | 485-545 (515) |
| 545-600 (572.5) | 520-580 (550) | 545-600 (572.5) |
| 600-700 | 580-700 | 600-700 |

Figure 6:
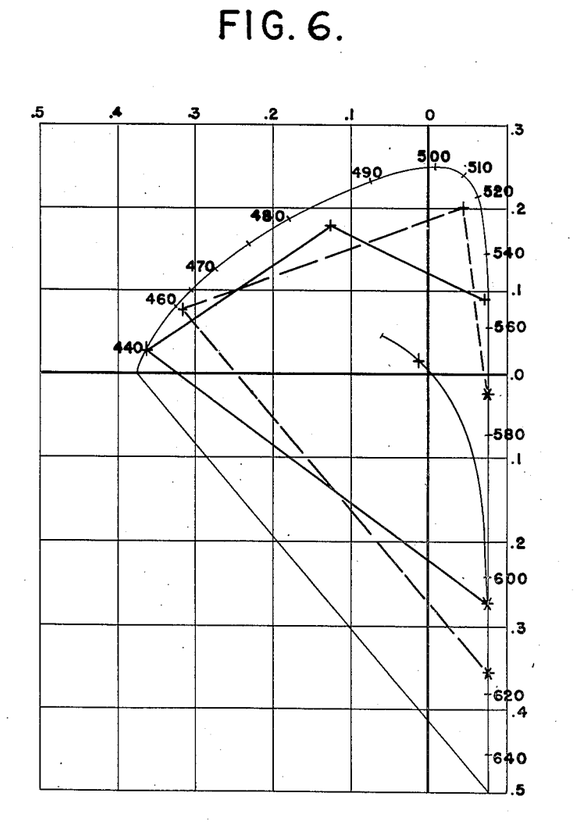

(Centers of intermediate bands in parenthesis.)
A is that which corresponds to Figures 4 and 5.
B and C are illustrated in Figure 6.

Response functions for such compromise four-color processes can also be computed. They show peaks at or near the dominant hues of the individual bands and they tend to be mutually exclusive, i. e., to cut sharply at the confines of the corresponding primary bands with only slight over-lap.

I have found that for a four-color process the peak of the short-wave response should be in the range 445-455 and for the red response in the range 605-630. For the intermediate responses the two peaks should be respectively in the ranges 490-535 and 545-575, depending upon the actual colorants employed.

The narrowness of the response functions should be noted. While narrow responses for the red and green bands are sometimes incorporated in three-color processes, the above-mentioned chlor response is novel. Its half-width, i. e., the width within which response is at least half of the maximum, is in the range from 30 to 45 millimicrons, but may extend to 70 millimicrons.

The present invention in its more practical aspects utilizes, in the steps of producing color component images in a multicolor reproduction process, four subtractive color components which collectively absorb light uniformly throughout the visible spectrum. Three of the color components absorb light in the red, green, and violet regions of the spectrum. One additional colorant is provided, which absorbs light in the yellow-green but not in the red region of the spectrum.

An important aspect of the invention, as pointed out above, is concerned with four-color photography. In this process a multicolor object field is reproduced by providing color component picture images in partial overlapping light-absorbing superposition from four subtractive colorants including a yellow which absorbs light generally at 450 millimicrons and shorter, an orange or pink whose absorption centers in the range 485 to 525 millimicrons, a purple whose absorption centers within the range 545 to 575 millimicrons, and a cyan which absorbs generally at 600 millimicrons and longer. I have found that the absorption band widths in the two intermediate ranges just given may be of the order of 100 millimicrons. Excessively wide absorptions, however, cannot be used.

One aspect of the invention consists of a process of reproducing multicolor object fields by exposing light-sensitive emulsion layers of photosensitive elements to said fields through four appropriate filters which produce responses peaking in the ranges described above and appropriately narrow. The elements are then developed, fixed, washed, and dried and four color separation negatives are produced. These image records are then copied and converted into four respective colored component image records which are in partial overlapping light-absorbing superposition having absorption characteristics predominating in the four zones described above, namely (1) a yellow which absorbs light generally at 450 millimicrons and shorter, (2) a pink whose light absorption centers in the range 485 to 525 millimicrons, (3) a purple whose light absorption centers in the range 545 to 575 millimicrons, and (4) a cyan which absorbs generally at 600 millimicrons and longer wave lengths. Images (2) and (3) should preferably have absorption bands whose widths are not greater than 100 millimicrons. The subtractive color component images, which may be in the form of various dyes, pigments, inks of organic or inorganic type, color developed dye images, color toned images, etc., are superposed in register. When they are superposed in register on a transparent or opaque surface either multicolor transparencies or reflection prints are formed.

In photomechanical prints an added black or gray component can be superimposed if desired. Its function would be, as in three-color photomechanical processes, to cover up process defects and the appropriate response function for such an added component would, as in three-color processes, bear no precise relation to the fundamental color-mixture data.

It is to be noted that a unique feature present in the four-color processes and which serves to distinguish them completely from a three-color process is the provision of a colorant controlling a narrow band centering in the greenish-yellow region of the spectrum. Suitable dyes for this colorant are the methyl ester of Rhodamine B or Rhodamine B itself (C. I. 749). These dyes can be insolubilized by precipitating them with phosphotungstic acid in the usual manner. The pigments so formed, when measured in a thin zein ink film, show absorption bands of appropriate width centering on 557 millimicrons for the former dye and 549 millimicrons for the latter dye.

Another suitable colorant for this purpose can be made from Kiton Brilliant Red B (C. I. 748). This acid dye can be insolubilized by precipitating it with diphenyl-guanidine chloride according to the procedure of Rose United States Patent 1,674,128. In this form it is soluble in alcohol and, when incorporated in a glycol-zein vehicle, can be made into an ink. In this form, it shows an absorption band about 75 millimicrons wide centering on 554.

The pink colorant for a four-color process can be made from a mixture of Rhodamine 6G (C. I. 752) with 3,3-tetraethyldiaminoacridine.HCl or with Basic Orange 3RN (C. I. 788), all three being precipitated with phosphotungstic acid in the usual manner. The first-mentioned produces a colorant having an absorption center at 523 and the second an absorption center at 497. The third has an absorption center at 490.

Another pink colorant can be made by precipitating Eosine Y (C. I. 768) with diphenylguanidine chloride. Dissolved in a glycol-zein vehicle, this yields an ink whose absorption band is about 65 millimicrons wide centering on 520.

The yellow and cyan colorants in the four-color processes described herein do not differ essentially from those used in three-color methods of reproduction. In the field of pigments there are many available yellow colorants to choose from including chrome yellows, Hansa yellows and benzidine yellows. (See The Chemistry and Physics of Organic Pigments by Pratt, published by Wiley, 1947.) There are also many acid dyes, such as Tartrazine (C. I. 640), Milling Yellow 5G (C. I. 642), and Quinoline yellow (C. I. 801) and basic dyes, such as Thioflavine TCN (C. I. 815) and Auramine (C. I. 655) which can be used in various ways.

The choice of cyan colorants is not so great but the possibilities have been well explored for three-color use. Amongst pigments there are various members of the phthalocyanine family and the peacock blue lakes. (See Pratt supra.) Amongst acid dyes there are, for example, Fast Turquoise 8GL (du Pont) and Brilliant Milling Green B (C. I. 667). These dyes can be precipitated with guanidine to form glycol-soluble colorants or they can be precipitated with barium or other metallic ions on a suitable substrate in the usual manner. Amongst suitable basic dyes there is Rhoduline Blue 6G (C. I. 658).

The invention will be further illustrated but is not intended to be limited by the following example.

*Example*

Three photographic films consisting of a film base bearing a gelatin silver iodobromide emulsion layer sensitized with a panchromatic sensitizing dye, e. g., 2-p-diethylaminostyryl benzothiazole ethiodide or 2-p-diethylaminostyryl benzoselenazole ethiodide are respectively exposed to a multicolor scene or object field through (1) a filter for the red response which cuts sharply at 590 millimicrons (e. g., "Wratten" #25), (2) a filter for the green response which cuts out at 490 and 570 millimicrons (e. g., a combination of a "Wratten" #61 and a "Wratten" #43), and (3) through a filter for the blue response which cuts appropriately at 400 and 500 millimicrons (e. g., a "Wratten" #47). A fourth photographic film consisting of a film base bearing a gelatino-silver iodobromide emulsion layer which contains an orthochromatic sensitizing dye, e. g., 6'-diethylamino-1',3-diethylthia-2'-cyanine iodide or N,N'-diethylaminothiapseudocyanine ethiodide, was exposed to the same multicolor scene through a filter which cuts appropriately for the spectral yellow or "chlor" response, e. g., a gelatin filter dyed with Flavazine T ("Wratten" #16). The exposed elements are developed in an ordinary metol-hydroquinone negative type developer and fixed, washed, and dried. From the four negatives, four screened plates suitable for press printing are made by known methods. These can be designed for letter-press printing or alternatively for lithography or for gravure. The methods of preparing such plates are described in many books; for example, the Seventh Annual Advertising & Publishing Production Yearbook, published by Colton Press (1941), New York. From these four printing plates containing the screened images of the original multicolor scene, successive imprintations are made on a single sheet of paper in register in the following manner:

The blue-violet record is printed in an oil varnish ink containing benzidene yellow (see The Chemistry and Physics of Organic Pigments by Pratt, pp. 101, etc., published by Wiley, 1947), e. g., OJ-54 (International Printing Ink Company) with the addition of suitable dryer and diluted with clear varnish to give the desired depth of color.

The green record is printed in an oil varnish ink made by dispersing 50 grams of the phosphotungstic acid precipitate of Rhodamine 6G (C. I. #752) and 50 grams of the phosphotungstic acid precipitate of 3,3-tetraethyldiaminoacridine in 100 grams of linseed-oil varnish and adding a dryer and clear varnish as desired.

The chlor record is printed in oil varnish ink made from a stock containing 100 grams of the phosphotungstic acid precipitate of the methyl ester of Rhodamine B (C. I. 749) in 100 grams of varnish.

The red record is printed in oil varnish ink containing Peacock Blue pigment, e. g., OB-25 (International Printing Ink Company).

It will be apparent from the above that the present invention is of considerable scope and is of general application in the photographic and graphic arts including continuous tone and halftone dot structure processes and also photogravure processes of printing multicolor pictures.

In the foregoing specification and in the accompanying claims it will be understood that the converting of images into colored images may be accomplished either photographically (by any of the methods now in common use) or mechanically (by any of the printing methods now in common use, e. g., relief, planographic or intaglio). Moreover, when it is stated that images are superposed in register, it is meant that if the selected process involves mechanical printing, the images to be observed by the eye are in register in the same sense that conventional relief, planographic or intaglio images are now superposed in register in conventional printing operations. When accomplished mechanically, these images may be formed by the printers' plates or by the ink as it exists on the plates just prior to the imprintation thereof upon the paper, or after imprintation.

Four-color reproduction processes are provided which are superior to three-color processes, not only because of increased gamut but also because of their ability to reproduce within that gamut with greater fidelity.

The four-color process particularly provides considerable freedom of choice regarding the primaries as contrasted with three-color processes wherein the severity of the compromises results in a lack of such freedom.

Since practical dyes and pigments are not perfect in that they exhibit some absorption in spectral bands other than those they are designed to control, a balanced group of dyes or pigments whether selected for a three-, a four- or a five-color process will some times exhibit overlapping absorption characteristics. These imperfections can be counteracted by conventional masking procedures. The principles of masking are well known, being described in the article by MacAdam entitled Physics in color photography in the Journal of Applied Physics for January 1940, the article by A. Marriage entitled Comparison of masking methods for subtractive color processes in the Photog. Journal, 1940, pages 364-74, and the series of articles by Preucil in the National Lithographer for 1947 and 1948 and such masking techniques form no part of the present invention but can be practiced with it as well as other multicolor processes. Although the above articles refer to masking procedures with three primaries, the principles involved are applicable to four- and five component processes and the necessary steps will be obvious to anyone skilled in the art.

The Colour Index referred to above and by the abbreviation C. I. is the Society of Dyers and Colourists Colour Index, edited by F. M. Rowe, first edition, January 1924, published by The Society, Bradford, Yorkshire, England.

The present application is a continuation-in-part of application Ser. No. 634,253, filed December 11, 1945 (now abandoned).

As many widely different embodiments of this invention can be made without departing from the spirit and scope thereof, it is to be understood that the invention is not to be limited except as defined by the claims.

What is claimed is:

1. In a four-component subtractive color reproduction process, the steps which comprise exposing four light-sensitive photographic layers to produce four color separation negatives through light filters which will produce response peaks in the ranges 445 to 455, 605 to 630, 490 to 535 and 545 to 575 millimicrons, respectively, developing the latent images so produced, converting the resulting negative images to four colored positive images which have predominant absorption in the ranges 450 millimicrons and shorter, 600 millimicrons and longer, 485 to 525 and 545 to 575 millimicrons, respectively, and superposing said positive colored images in register.

2. In a four-component subtractive color reproduction process, the steps which comprise exposing four light-sensitive photographic layers to produce four color separation negatives through light filters which will produce response peaks in the respective ranges 445 to 455, 605 to 630, 490 to 535 millimicrons which have transmission band-width not greater than 50 millimicrons at one-half the maximum transmission and 545 to 575 millimicrons with a transmission band-width not greater than 70 millimicrons at one-half the maximum transmission, developing the latent images so produced, converting the resulting negative images to four colored positive images which have predominant absorption in the ranges 450 millimicrons and shorter, 600 millimicrons and longer, 485 to 525 and 545 to 575 millimicrons, respectively, and superposing said positive colored images in register.

3. In a four-component subtractive color reproduction process, the steps which comprise exposing four light-sensitive photographic layers to produce four color separation negatives through light filters which will produce response peaks in the ranges 445 to 455, 605 to 630, 490 to 535, and 545 to 575 millimicrons, respectively, developing the latent images so produced, printing four color separation positive image records from the developed images, converting said positive images into relief images and transferring the relief images onto a gelatin blank by imbibition of four dyes, which have predominant absorption in the ranges 450 millimicrons and shorter, 600 millimicrons and longer, 485 to 525 and 545 to 575 millimicrons respectively.

4. In a four-component subtractive color reproduction process, the steps which comprise exposing four light-sensitive photographic layers to produce four color separation negatives through light filters which will produce response peaks in the ranges 445 to 455, 605 to 630, 490 to 535, and 545 to 575 millimicrons, respectively, developing the latent images so produced, making four respective printing plates with positive images from the developed images and making separate successive imprintations therefrom in register on sheet material from inks containing colorants, which have predominant absorption in the ranges 450 millimicrons and shorter, 600 millimicrons and longer, 485 to 525 and 545 to 575 millimicrons, respectively.

5. In a four-component subtractive color reproduction process, the steps which comprise exposing four light-sensitive photographic layers to produce four color separation negatives through light filters which will produce response peaks in the respective ranges 445 to 455, 605 to 630, 490 to 535 millimicrons with band-widths not greater than 60 millimicrons at one-half the maximum transmission, and 545 to 575 and having a transmission band-width not greater than 70 millimicrons at one-half the maximum transmission, developing the latent images so produced, making four respective printing plates with positive images from the developed images and making separate successive imprintations from the developed images in register on sheet material from inks containing colorants, which have predominant absorption in the ranges 450 millimicrons and shorter, 600 millimicrons and longer, 485 to 525 and 545 to 575 millimicrons, respectively.

6. In a four component subtractive color reproduction process in which four separate, light-sensitive layers are exposed to different spectral ranges of light and the resultant images are converted into positive images in colorants which collectively absorb throughout the visible spectrum, the step which comprises exposing one light-sensitive photographic layer to produce a response of half-width not greater than 70 millimicrons and having a maximum in the range 545 to 575 millimicrons, developing the latent image formed and utilizing the image so produced to create a positive image in a purple colorant having an absorption centering in the range 545 to 575 and a band-width not greater than 100 millimicrons, and exposing another of said light-sensitive photographic layers to produce a response of half-width not greater than 70 millimicrons and having a maximum in the range 490 to 535 millimicrons, developing the latent image formed and utilizing the record so produced to create a positive in a colorant having an absorption centering in the range 485 to 525 millimicrons and a band-width not greater than about 100 millimicrons.

7. In a four component subtractive color reproduction process, the steps which comprise exposing four color separation negatives through light filters which will produce responses peaking at about 450, 530, 570 and 610 millimicrons with transmission band-widths not greater than 60 millimicrons at one-half the maximum transmission, developing the latent images so produced, converting the resultant negative images to four color positive images, the colorants of which combine to produce substantially uniform absorption throughout the visible spectrum and which have predominant absorption in the bands 485 and shorter, 485 to 545, 545 to 600 and 600 millimicrons and longer respectively and superimposing said colored positive images in register.

JOSEPH A. BALL.

REFERENCES CITED

The following references are of record in the file of this patent:

UNITED STATES PATENTS

| Number | Name | Date |
| --- | --- | --- |
| 884,254 | Zander | Apr. 7, 1908 |

OTHER REFERENCES

Wall: "History of Three Color Photography," 1925, pages 37 to 44; publ. by Amer. Phot. Publ. Co., Boston.